US006966523B2

(12) United States Patent
Colting

(10) Patent No.: US 6,966,523 B2
(45) **Date of Patent: *Nov. 22, 2005**

(54) AIRSHIP AND METHOD OF OPERATION

(75) Inventor: Hokan S. Colting, Newmarket (CA)

(73) Assignee: 21st Century Airships Inc., Newmarket (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/718,634

(22) Filed: Nov. 24, 2003

(65) Prior Publication Data

US 2005/0173591 A1 Aug. 11, 2005

Related U.S. Application Data

(63) Continuation of application No. 10/178,345, filed on Jun. 25, 2002.

(51) Int. Cl.[7] .................... B64B 1/02
(52) U.S. Cl. .................... 244/30; 244/97
(58) Field of Search .................... 244/30, 31, 96, 244/97, 127, 128

(56) References Cited

U.S. PATENT DOCUMENTS

| | | | | |
|---|---|---|---|---|
| 607,240 | A | | 7/1898 | Hite |
| 1,599,496 | A | | 9/1926 | Sheppard |
| 2,191,759 | A | | 2/1940 | Hilberth |
| 2,654,552 | A | | 10/1953 | Jonas |
| 2,868,478 | A | | 1/1959 | McCloughy |
| 2,929,581 | A | | 3/1960 | Johnson, Jr. |
| 3,079,106 | A | | 2/1963 | Whitnah |
| 3,265,142 | A | | 8/1966 | Winter |
| 3,488,019 | A | | 1/1970 | Sonstegaard |
| 3,834,655 | A | | 9/1974 | Crosby |
| 3,957,228 | A | | 5/1976 | Kennedy, Jr. |
| 4,085,912 | A | | 4/1978 | Slater |
| 4,262,864 | A | * | 4/1981 | Eshoo ........ 244/31 |
| 4,366,936 | A | * | 1/1983 | Ferguson ........ 244/2 |

(Continued)

FOREIGN PATENT DOCUMENTS

DE 40 09 772 10/1991

(Continued)

OTHER PUBLICATIONS

J. D. Delaurier et al., Preliminary report on the engineering development of the Magnus Aerospace Corp. LTA 20-1 heavy-lift aircraft, The Aeronautical Journal of the Royal Aeronautical Society, Apr. 1983, 119-131, Royal Aeronautical Society, London, England.

(Continued)

*Primary Examiner*—Robert P. Swiatek

(57) ABSTRACT

An airship has a generally spherical shape and has an internal envelope for containing a lifting gas such as Helium or Hydrogen. The airship has a propulsion and control system that permits it to be flown to a desired loitering location, and to be maintained in that location for a period of time. In one embodiment the airship may achieve neutral buoyancy when the internal envelope is as little as 7% full of lifting gas, and may have a service ceiling of about 60,000 ft. The airship has an equipment module that can include either communications equipment, or monitoring equipment, or both. The airship can be remotely controlled from a ground station. The airship has a solar cell array and electric motors of the propulsion and control system are driven by power obtained from the array. The airship also has an auxiliary power unit that can be used to drive the electric motors. The airship can have a pusher propeller that assists in driving the airship and also moves the point of flow separation of the spherical airship further aft. In one embodiment the airship can be refuelled at altitude to permit extended loitering.

25 Claims, 9 Drawing Sheets

U.S. PATENT DOCUMENTS

| | | | | |
|---|---|---|---|---|
| 4,377,982 | A * | 3/1983 | Gongwer | 114/312 |
| 4,773,617 | A | 9/1988 | McCampbell | |
| 4,792,107 | A | 12/1988 | Fernz et al. | |
| 4,931,028 | A | 6/1990 | Jaeger | |
| 5,076,513 | A | 12/1991 | Regipa et al. | |
| 5,115,997 | A | 5/1992 | Peterson | |
| 5,294,076 | A | 3/1994 | Colting | |
| 5,348,254 | A | 9/1994 | Nakada | |
| 5,358,200 | A | 10/1994 | Onda | |
| 5,518,205 | A | 5/1996 | Wurst et al. | |
| 5,645,248 | A * | 7/1997 | Campbell | 244/30 |
| 6,119,983 | A | 9/2000 | Provitola | |
| 6,142,414 | A | 11/2000 | Doolittle | |
| 6,305,641 | B1 | 10/2001 | Onda | |
| 6,371,409 | B1 | 4/2002 | Steele | |
| 6,427,943 | B2 | 8/2002 | Yokomatu et al. | |
| 2001/0002686 | A1 | 6/2001 | Yokomaku et al. | |

FOREIGN PATENT DOCUMENTS

| | | |
|---|---|---|
| DE | 42 04 962 | 8/1993 |
| DE | 19 744 580 | 4/1999 |
| EP | 0 078 713 | 5/1983 |
| EP | 0 887 259 | 12/1998 |
| FR | 372168 | 12/1906 |
| FR | 445171 | 6/1912 |
| FR | 2132610 | 11/1972 |
| FR | 2673418 | 9/1992 |
| GB | 250602 | 7/1927 |
| GB | 2196919 | 5/1988 |
| GB | 2366273 | 3/2002 |
| WO | WO9504407 | 2/1995 |
| WO | WO0058152 | 10/2000 |

OTHER PUBLICATIONS

J. D. Lowe, AIAA-85-0878—An Investigation into the Hovering Behaviour of the LTA-20-1 Airship in Calm and Turbulent Air, AIAA 6th Lighter-Than-Air Systems Conference, Jun. 26-28, 1985, 108-114, American Institute of Aeronautics and Astronautics, Inc., New York.

J. D. Lowe et al., AIAA-85-0879—An Experimental Determination of the Longitudinal Stability Properties of the LTA 20-1, AIAA 6th Lighter-Than-Air Systems Conference, Jun. 26-28, 1985, 115-123, American Institute of Aeronautics and Astronautics, Inc., New York.

J. Delaurier et al., AIAA-85-0876—Progress Report on the Engineering Development of the Magnus Aerospace LTA 20-1 Airship, AIAA 6th Lighter-Than-Air Systems Conference, Jun. 26-28, 1985, 90-99, American Institute of Aeronautics and Astronautics, Inc., New York.

J. Delaurier et al., AIAA-83-2003—Development of the Magnus Aerospace Corporation's Rotating-Sphere Airship, AIAA Lighter-Than-Air Systems Conference, Jul. 25-27, 1983, 161-170, American Institute of Aeronautics and Astronautics, Inc., New York.

* cited by examiner

AIRSHIP AND METHOD OF OPERATION

This application is a continuation application of my co-pending U.S. patent application Ser. No. 10/178,345 filed Jun. 25, 2002, which application is hereby incorporated by reference herein.

FIELD OF THE INVENTION

This invention relates to the field of buoyant aircraft and operation thereof.

BACKGROUND OF THE INVENTION

In a number of applications it would be desirable to be able to provide a relatively stationary high altitude platform, hence the desirability of the present invention.

One known kind of stationary high altitude platform is a geo-stationary satellite located 36,000 km above the earth. While a geostationary satellite system may have a large "footprint" for communications or surveillance purposes, this may be higher than is desirable for high resolution observation, and the development and launch cost of a spacecraft may tend to be very high. Non-stationary, or low orbit satellites are also known, but they are at any given point in the sky only momentarily. It would therefore be advantageous to be able to operate a stationary platform at lower altitude, lower complexity, and rather lower cost.

A number of concepts for high atmospheric altitude platforms already exist, such as high altitude balloons, large dirigibles or blimps, unmanned heavier-that-air aircraft (drones) of traditional configuration or of flying wings configuration. Free balloons or tethered balloons would not tend to be suitable: a free balloon is not tethered, and will tend not to stay in one place; a 40,000–60,000 ft tether is not practicable (a) because of the weight of the tethers themselves; and (b) because of the danger to aerial navigation. Heavier-than-air aircraft tend not to have the required endurance, and any aircraft that relies on airflow over a lifting or other control surface must maintain sufficient velocity to maintain control, a problem that worsens when the density of the atmosphere is reduced.

Traditional airships, whether blimps or having a rigid internal skeleton tend generally to be low altitude aircraft, seldom being used at altitudes above about 5,000 ft above mean sea level. Modern airships that rely on the buoyancy of a lifting gas may tend to suffer from a number of disadvantages, such as (a) poor low-speed manoeuvrability; (b) the need for relatively large ground-crews for take-offs and landings; (c) the need for relatively large fields from which to operate; (d) complicated and expensive infrastructure for mooring (parking); and (e) susceptibility to damage in turbulent atmospheric conditions. In the view of the present inventor, many, if not all of these disadvantages appear to stem from the fundamental shape and configuration of traditional airships—that is, the characteristic elongated, finned hull.

The manoeuvrability of traditional airships tends to be related to the design and structure of their fins and control surfaces. Below 10 to 15 km/h (6–10 mph), there tends no longer to be sufficient airflow over the fins' control surfaces, making them ineffectual. When the pilot slows down, as when landing, a ground crew of up to 20 people may be required to assist the pilot. The same size of crew may also be required for take-off.

The spherical airship described herein has double envelopes. The outer envelope is load bearing and the inner envelope contains the lifting gas. For normal low-level flights at take-off, the inner envelope may typically be filled to 80%, of the internal volume of the outer envelope allowing the lifting gas to expand with altitude or temperature changes or both. When the inner envelope is fully expanded, the airship is at pressure altitude; meaning that it cannot climb higher without valving some lifting gas.

In the presently described airship, the air inside the outer envelope is slightly pressurized by electric blowers to maintain the airship's generally spherical shape and to resist deformation from wind loads. For the high altitude airship of the present invention, operating at 60–70,000 ft., the envelope must be sufficiently large enough to accommodate the 1,600–1,700% lifting gas expansion. Accordingly, in the present invention, at lift-off, the inner envelope may be filled to only as little as 1/18 of its total volume. The remaining 17/18 are filled with air at a slight (over) pressure.

During the climb to altitude, the lifting gas will tend to expand adiabatically, eventually occupying approximately 16/18ths of the total volume. At the designed operational altitude, it is intended still to have enough space to expand with temperature increase during daytime sun exposure. Note that the spherical airship tends not to have balancing problems at any stage of "fullness". The weight of the payload is at the bottom central portion of the airship, and the lift is directly above this with all the gravity and buoyancy forces acting straight up and down.

Traditional cigar shaped blimps may also tend to present other disadvantages when viewed in the context of an aircraft having a high altitude service ceiling. Conventionally, cigar shaped airships employ fore and aft balloonets that can be inflated, or deflated, as the internal gas bags expand or contract with changes in altitude or temperature. Differential inflation of the balloonets can also be used to adjust airship trim. The balloonet operation between sea level (where ambient pressure is about 14.7 psia) and 5000 ft (where ambient pressure is about 12.5 psia) may involve balloonets of roughly 20% of the internal volume of the aircraft. To reach a service ceiling of about 60,000 ft (where the ambient pressure is about 1.0 psia), the volume of the lifting gas used at lift-off from sea level may be as little as about 1/18 of the volume of the lifting gas at 60,000 ft. This may present significant control challenges at low altitude for a cigar shaped aircraft. Further, conventional airships tend to rely on airflow over their control surfaces to manoeuvre in flight. However, at high altitude the density of the air is sufficiently low that a much higher velocity may be required to maintain the level of control achieved at lower altitude. Further still, blimps and dirigibles are known to be susceptible to "porpoising". At 60,000 ft there is typically relatively little turbulence, and relatively light winds, or calm. In a light or "no-wind" situation, it may be difficult to maintain a cigar shaped dirigible "on station", i.e., in a set location for which the variation in position is limited to a fixed range of deviation such as a target box 1 km square relative to a ground station. Although 1 km may seem like a large distance, it is comparatively small relative to an airship that may be 300 m in length.

By contrast, a spherical airship may have a number of advantages, some of which are described in my U.S. Pat. No. 5,294,076, which is incorporated herein by reference. A spherical airship is finless, and so therefore does not depend on a relatively high airspeed to maintain flight control. For example, when equipped with a propulsion system that has thrust deflectors (louvers) located in the propeller slipstream, steering and altitude control can be achieved through the use of varied and deflected thrust.

With equal thrust on both engines the airship can be flown in a straight line. Increasing (or decreasing) the thrust on one side causes the airship to turn. Deflecting the propwash downward may tend to cause the airship to ascend; deflecting the propwash upward may tend to cause the airship to descend. The prototype developed by the present inventor is highly manoeuvrable even at low speed or when hovering, and tends to be able to turn on a dime.

The present inventor has dispensed with a traditional external gondola, and has, in effect, placed the gondola inside the envelope, allowing a generally larger space for the pilot, passengers (as may be), and payloads, (as may be). Without an external gondola the spherical airship may tend to be capable of landing on, and taking off from, water. Landing procedures are comparatively uncomplicated.

A substantially spherical airship has the most efficient ratio of surface area to volume. This may tend to result in a relatively low leakage rate of the lifting gas. The spherical shape also tends to facilitate the spreading of the payload without unduly affecting the balance (pitch) of the aircraft.

The present inventor has noted that when a spherical object, such as a spherical airship, is propelled through an ambient fluid, such as air, the flow of the ambient about the spherical shape tends to have a separation point, beyond which the flow is turbulent. It would be advantageous to shift this separation point further toward the trailing portion of the aircraft, since this may tend to reduce drag.

The present inventor has also noted other properties of a spherical airship that may tend to make it suitable for relatively long endurance use as a communications or surveillance platform. First, the envelope may tend to be transparent to electro-magnetic waves in the frequency ranges of interest, namely the electronic communications frequencies. This may tend to permit (a) remote control of the platform from a ground station, further reducing the weight aloft and lessening both (i) the risk of human injury in the event of a machine failure; and (ii) the need to land frequently for the comfort of the crew; (b) the use of the platform as a communications relay station for sending and receiving signals; and (c) the use of the station as a radar platform or as a listening station. In addition, it may be desirable to be able to refuel a stationary airship at altitude, thus permitting extension of the duration of operation.

SUMMARY OF THE INVENTION

The present inventor employs a spherical airship as a platform for relatively high altitude observation, or communications, with a tendency to permit relatively long endurance loitering in a particular location. The present inventor has also noted, that for either high or low altitude flight, it is advantageous to shift the point of separation of the flow to a relatively rearward location.

In an aspect of the invention there is a substantially spherical aircraft. The aircraft has a buoyancy apparatus operable to maintain the aircraft aloft. Propulsion and directional apparatus co-operable conduct the aircraft; and at least one boundary layer separation suppression element operable to encourage the aircraft to proceed as conducted.

In a feature of that aspect of the invention, the aircraft has a leading portion and a trailing portion, and the boundary layer separation suppression element includes a pump element mounted to create a zone of lowered fluid pressure adjacent to the trailing portion of the aircraft. In another feature, the aircraft has a leading portion and a trailing portion, and the boundary layer separation suppression element includes a pusher propeller mounted aft of the trailing portion of the aircraft.

In yet another feature, the aircraft has a leading portion and a trailing portion, and the boundary layer separation suppression element includes roughening mounted to the leading portion of the aircraft. In still another feature, the propulsion apparatus includes a pusher propeller. In a further feature, the aircraft has a main diametral dimension, D1, and the propeller has a diameter D2, where D2 lies in the range of 10% to 25% of D1. In yet a further feature, the pusher propeller operates between 0 and 250 r.p.m. In another feature, the pusher propeller has a tip speed of less than 500 ft/s. In still another feature, the pusher propeller is driven by an electric motor.

In still another further feature, an internal combustion engine and an electric generator is driven thereby. In yet a further feature, the aircraft has a fuel replenishment system. The fuel replenishment system is operable while the aircraft is aloft. In an additional feature, at least one of the propulsion and directional apparatus includes an internal combustion engine and a fuel replenishment system. The fuel replenishment system is operable while the aircraft is aloft. In another additional feature, the aircraft has solar cell panels.

In a further feature, the aircraft includes an electro magnetic interface member chosen from the set of electro-magnetic interface members capable of performing at least one of (a) receiving an electro-magnetic wave form; (b) sending an electro-magnetic wave form; (c) relaying an electro-magnetic wave form; and (c) reflecting an electro-magnetic wave form. In another further feature, the aircraft includes communications equipment operable to perform at least one of (a) receiving communications signals (b) sending communications signals; (c) relaying communications signals; and (d) reflecting communications signals. In an additional feature, the aircraft includes surveillance equipment. In another additional feature, the surveillance equipment is chosen from the set of surveillance equipment consisting of at least one of (a) communications monitoring equipment; (b) thermal imaging equipment; (c) photographic equipment; and (d) radar. In still another additional feature, the aircraft has a cowling, and the cowling is substantially transparent to at least radio frequency electro-magnetic waves.

In yet another additional feature, the aircraft has, mounted within the cowling, at least one of (A) communications equipment operable to perform at least one of (a) receiving communications signals (b) sending communications signals; (c) relaying communications signals; and (d) reflecting communications signals; and (B) surveillance equipment chosen from the set of surveillance equipment consisting of at least one of (a) communications monitoring equipment; (b) thermal imaging equipment; (c) photographic equipment; and (d) radar. In another feature, the cowling is internally pressurised relative to ambient conditions external to the aircraft. In yet another feature, the aircraft is remotely controlled.

In still another feature, the buoyancy apparatus includes an envelope mounted within the aircraft, and the envelope contains a buoyant lifting fluid. In still yet another feature, the lifting fluid is helium. In a further feature, the lifting fluid is hydrogen.

In yet a further feature, the substantially spherical aircraft has a weight and an internal volume. The envelope is variably inflatable to occupy a variable portion of the internal volume and under ambient conditions at sea level on a 59 F day, when the envelope is inflated to as little as 70% of the internal volume. The envelope provides a buoyant force at least as great as the weight. In another further feature, wherein under ambient conditions at sea level on a 59 F day, when the envelope is inflated to as little as 50% of the internal volume, the envelope provides a buoyant force at least as great as the weight. In still another feature, wherein under ambient conditions at sea level on a 59 F day, when the envelope is inflated to as little as 25% of the internal volume, the envelope provides a buoyant force at least as great as the weight. In yet another feature, wherein under ambient conditions at sea level on a 59 F day, when the envelope is inflated to as little as 10% of the internal volume, the envelope provides a buoyant force at least as great as the weight. In still yet another feature, wherein under ambient conditions at sea level on a 59 F day, when the envelope is inflated to as little as 7.5% of the internal volume, the envelope provides a buoyant force at least as great as the weight.

In a further feature, the aircraft has a service ceiling of greater than 10,000 ft. In still a further feature, the aircraft has a service ceiling of greater than 18,000 ft. In still yet a further feature, the aircraft has a service ceiling of greater than 40,000 ft. In another feature, the aircraft has a service ceiling of greater than 60,000 ft.

In another aspect of the invention there is a substantially spherical aircraft. The aircraft has buoyancy apparatus operable to maintain the aircraft aloft. Propulsion and directional apparatus co-operable conduct the aircraft; and a fuel replenishment system connected to the propulsion and directional apparatus. The fuel replenishment system is operable while the aircraft is aloft.

In another aspect of the invention there is a substantially spherical aircraft. The aircraft has buoyancy apparatus operable to maintain the aircraft aloft. Propulsion and directional apparatus co-operable conduct the aircraft; and the aircraft has at least one of: (A) communications equipment operable to perform at least one of (a) receiving communications signals (b) sending communications signals; (c) relaying communications signals; and (d) reflecting communications signals; and (B) surveillance equipment chosen from the set of surveillance equipment consisting of at least one of (a) communications monitoring equipment; (b) thermal imaging equipment; (c) photographic equipment; and (d) radar.

In another aspect of the invention there is a substantially spherical aircraft. The substantially spherical aircraft has a weight and an internal volume. The aircraft has buoyancy apparatus operable to maintain the aircraft aloft. Propulsion and directional apparatus co-operable conduct the aircraft. The buoyancy apparatus includes an envelope mounted within the aircraft, and the envelope contains a buoyant lifting fluid. The envelope is variably inflatable to occupy a variable portion of the internal volume; and under ambient conditions at sea level on a 59 F day, when the envelope is inflated to as little as 70% of the internal volume, the envelope provides a buoyant force at least as great as the weight. In a feature of that aspect of the invention, the lifting fluid is hydrogen.

In another feature, wherein under ambient conditions at sea level on a 59 F day, when the envelope is inflated to as little as 50% of the internal volume, the envelope provides a buoyant force at least as great as the weight. In yet another feature, wherein under ambient conditions at sea level on a 59 F day, when the envelope is inflated to as little as 10% of the internal volume, the envelope provides a buoyant force at least as great as the weight. In still yet another feature, the aircraft has a service ceiling of greater than 10,000 ft. In still another feature, the aircraft has a service ceiling of greater than 40,000 ft.

In another aspect of the invention there is a method for operating a buoyant aircraft. The method comprises the steps of providing an aircraft having an internal volume, and a weight. The aircraft includes an inflatable envelope housed within the internal volume, and the aircraft has a propulsion system and a directional control system, inflating the envelope with a lifting fluid to a first volume sufficient to at least balance the weight. The first volume, at sea level, is less than 70% of the internal volume, operating the propulsion and directional control systems to a location greater than 10,000 ft above sea level.

In a feature of that aspect of the invention, the method includes the step of maintaining the aircraft in a loitering location. In another feature, the method includes the steps of maintaining the aircraft aloft in a loitering position and refuelling the aircraft while maintaining it in the loitering position. In still another feature, the step of loitering maintaining the aircraft in the loitering position includes the step of maintaining lateral and longitudinal position variation relative to a deviation radius of 1000 M. In yet another feature, including maintaining the aircraft at an altitude of at least 15,000 ft. In still yet another feature, further including at least one of the steps chosen from the set of steps consisting of: (A) operating as a communications platform to do at least one of (a) receiving communications signals (b) sending communications signals; (c) relaying communications signals; and (d) reflecting communications signals; and (B) operating as a surveillance platform to (a) monitor communications; (b) produce thermal imaging; (c) take photographs; and (d) to operate a radar. In an additional feature, including the step of controlling operation of the buoyant aircraft from a remote location.

BRIEF DESCRIPTION OF THE DRAWINGS

The principles of the various aspects of the invention may better be understood by reference to the accompanying illustrative Figures which depict features of examples of embodiments of the invention, and in which.

DETAILED DESCRIPTION OF THE INVENTION

Figure 1A:
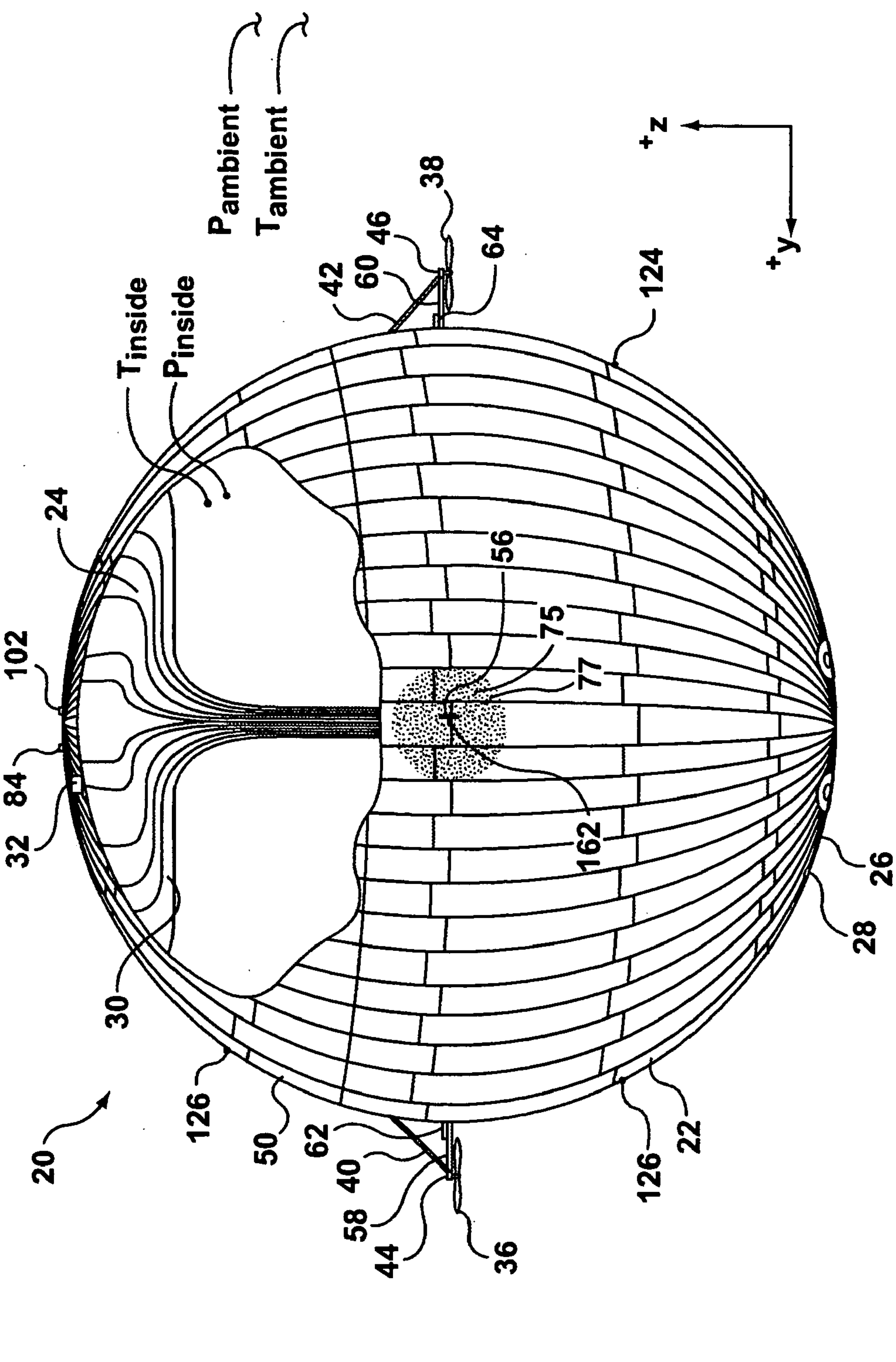
FIG. 1*a* is a low altitude, front elevation of an airship according to an aspect of the present invention, with a scab section provided to show a partially inflated lifting gas envelope.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

For the purposes of this description, it will be assumed that operating conditions are referenced to an ISA standard day, namely to a datum of atmospheric conditions at sea level on a 15 C (59 F) day. Also for the purposes of description, if the aircraft is thought of as having a vertical, or z-axis, a longitudinal, or x-axis, and a transverse or y-axis, pitch is rotation about the y-axis, roll is rotation about the x-axis, and yawing is rotation about the z-axis. The force of gravity, and hence buoyancy, acts parallel to the z-axis. Fore and aft (and leading and trailing) are terms having reference to the x-axis.

In the embodiment of FIG. 1*a*, a substantially spherical airship is indicated generally as 20. Airship 20 has a load bearing outer envelope 22 and a lifting gas containing inner envelope 24.

Outer envelope 22 is made of an array of Spectra (t.m.) or other high strength fabric panels, sewn or heat welded together. An electric blower, or fan, 26 is mounted in a lower region of outer envelope 22. Blower 26 has an intake drawing air from external ambient, and an outlet mounted to discharge into the interior of outer envelope 22. Blower 26 is used to maintain the internal volume of airship 20 within outer envelope 22 at an elevated pressure relative to the $P_{Ambient}$, of the external ambient conditions. This differential pressure tends to cause outer envelope 22 to assume, and maintain, the substantially spherical shape shown. In the event that the differential internal pressure within outer envelope 22 as compared to ambient becomes excessive, a relief valve 28 mounted to a lower region of outer envelope 22 will open to dump pressure accordingly. It is preferred that the pressure differential be about ½ inch of water gauge, and that relief valve 28 will open at about 1 inch of water gauge.

Buoyancy

Inner envelope 24 is a laminated bladder, or gas bag, 30, for containing a fluid in the nature of a lifting gas, such as helium or hydrogen. Gas bag 30 has a fully expanded volume that is roughly 18 times as great as the volume for providing buoyancy at sea level. The design volume of outer envelope 22 is large enough to allow for this full expansion, plus the internal volume of the payload and operating equipment. For the purposes of this explanation, the "internal volume" of outer envelope 22 is taken as only the space allocated for allowing expansion of inner envelope 24 in normal service operation up to the design service ceiling. In the preferred embodiment this service ceiling is 60,000 ft.–70,000 ft. with a lifting gas expansion of 10.7–17.4 times the volume at sea level. However, additional volume inside outer envelope 22 is left to allow for solar heating (and consequent expansion) of the lifting gas in gas bag 30 during daylight operation, with a margin for unforeseen contingencies. While unnecessary bleeding of lifting gas is generally considered undesirable, in the event that the buoyancy of gas bag 30 becomes excessive, a dump valve in the nature of gas bag relief valve 32 is provided to permit dumping of lifting gas. Aircraft 20 may also have an optional supplementary lifting gas reservoir 34 that is connected to gas bag 30 to provide lifting gas to replace leakage that may occur over a period of time. Preferably, gas bag 30 is operable to provide neutral buoyancy to aircraft 20 when gas bag 30 is only 5% full at mean sea level and 15 C.

Propulsion and Control Apparatus

Figure 1B:
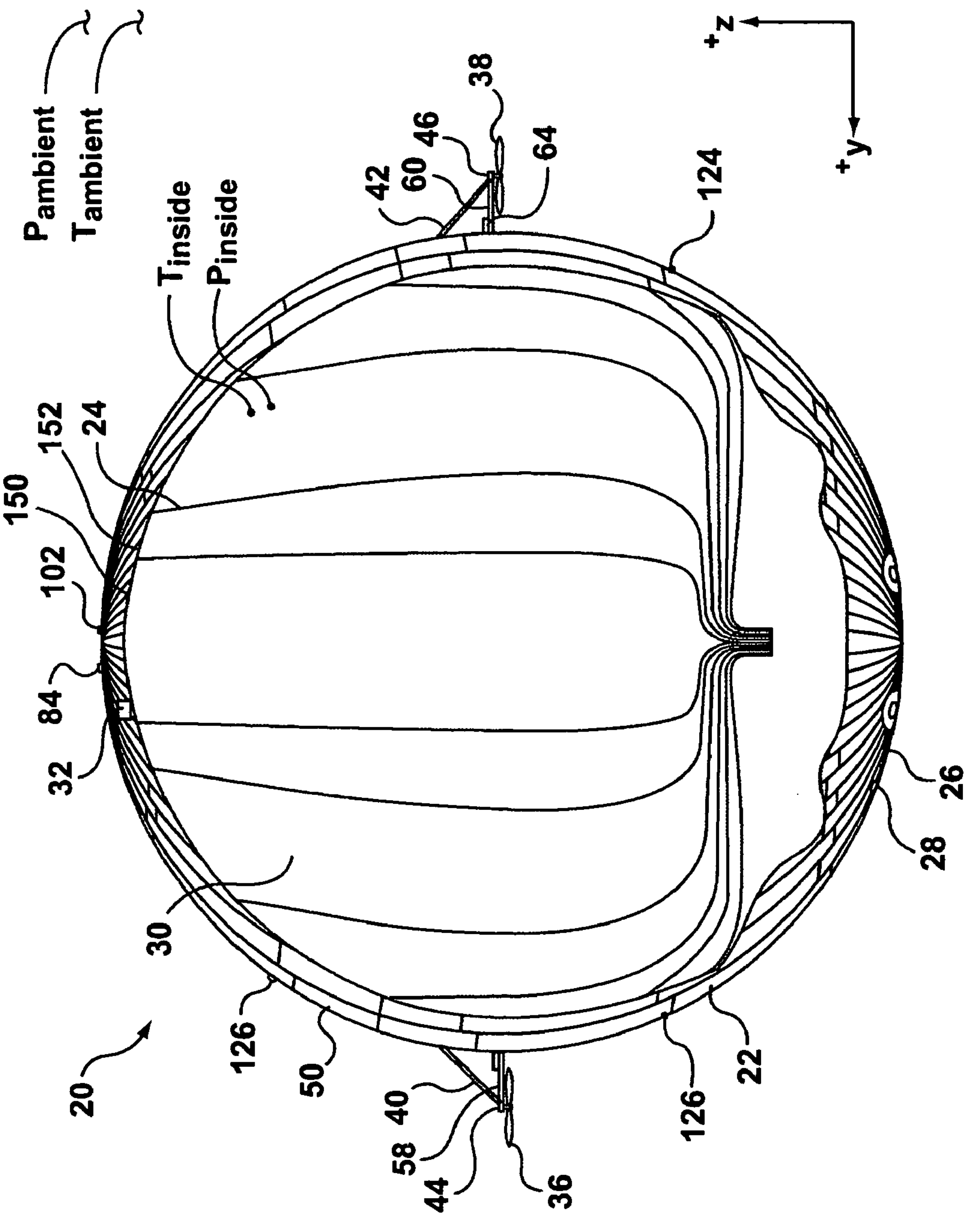
FIG. 1*b* is a higher altitude, front elevation of the airship of FIG. 1*a* with a larger scab section provided to show more fully inflated condition of the lifting gas bag at higher altitude.
Figure 2:
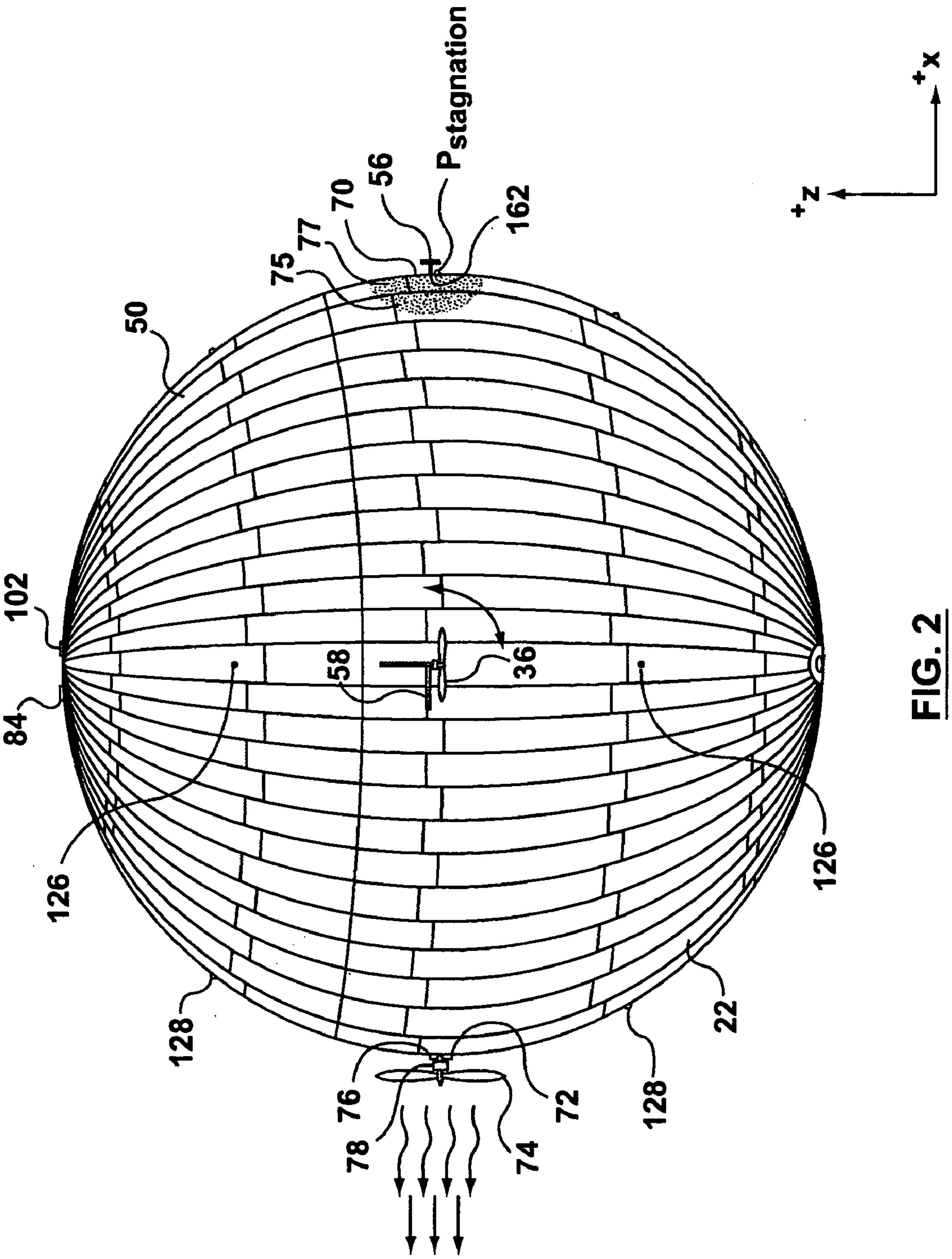
FIG. 2 is a side elevation of the airship of FIG. 1*a;*
Figure 3:
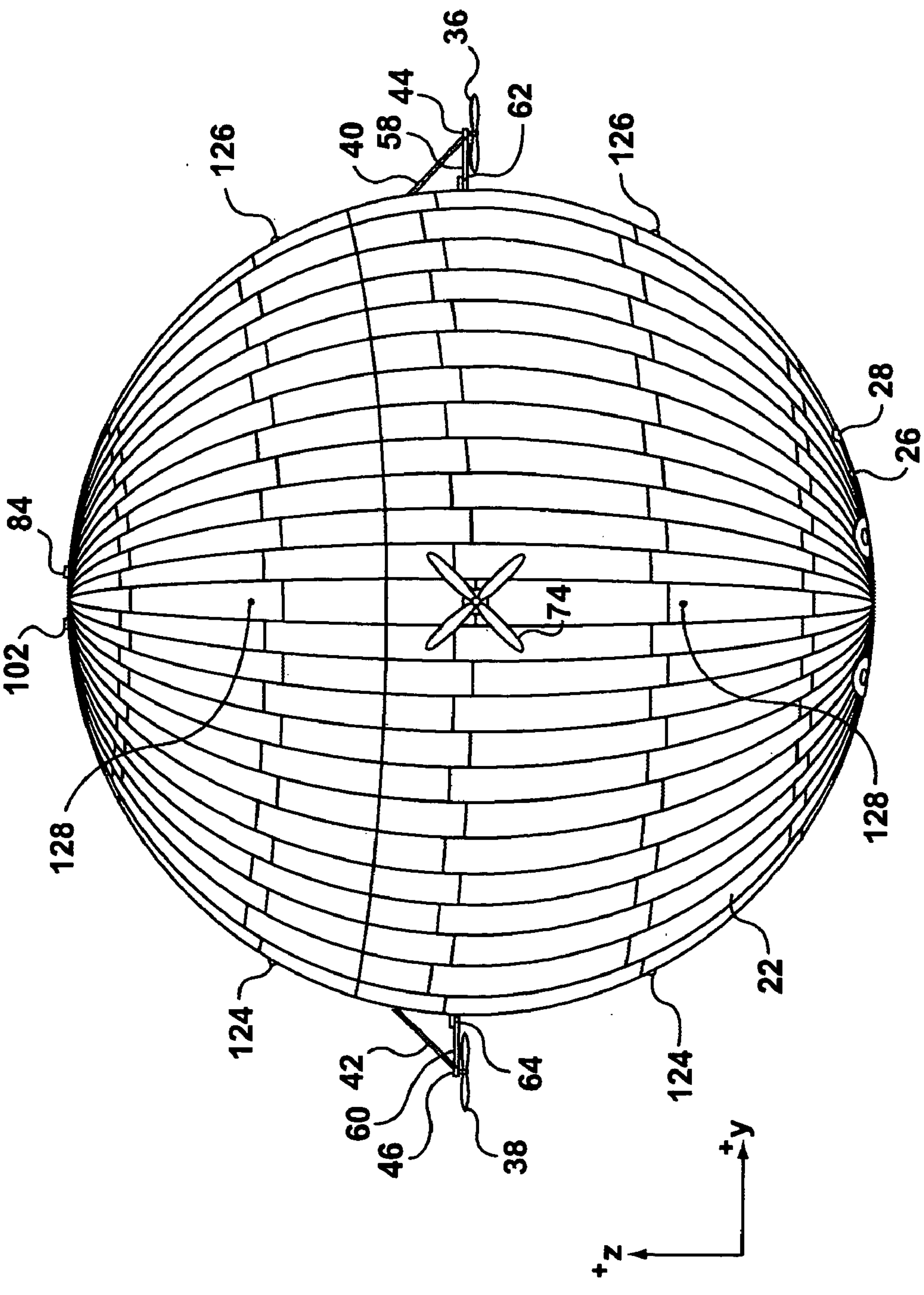
FIG. 3 is a rear elevation of the airship of FIG. 1*a;*
Figure 4A:
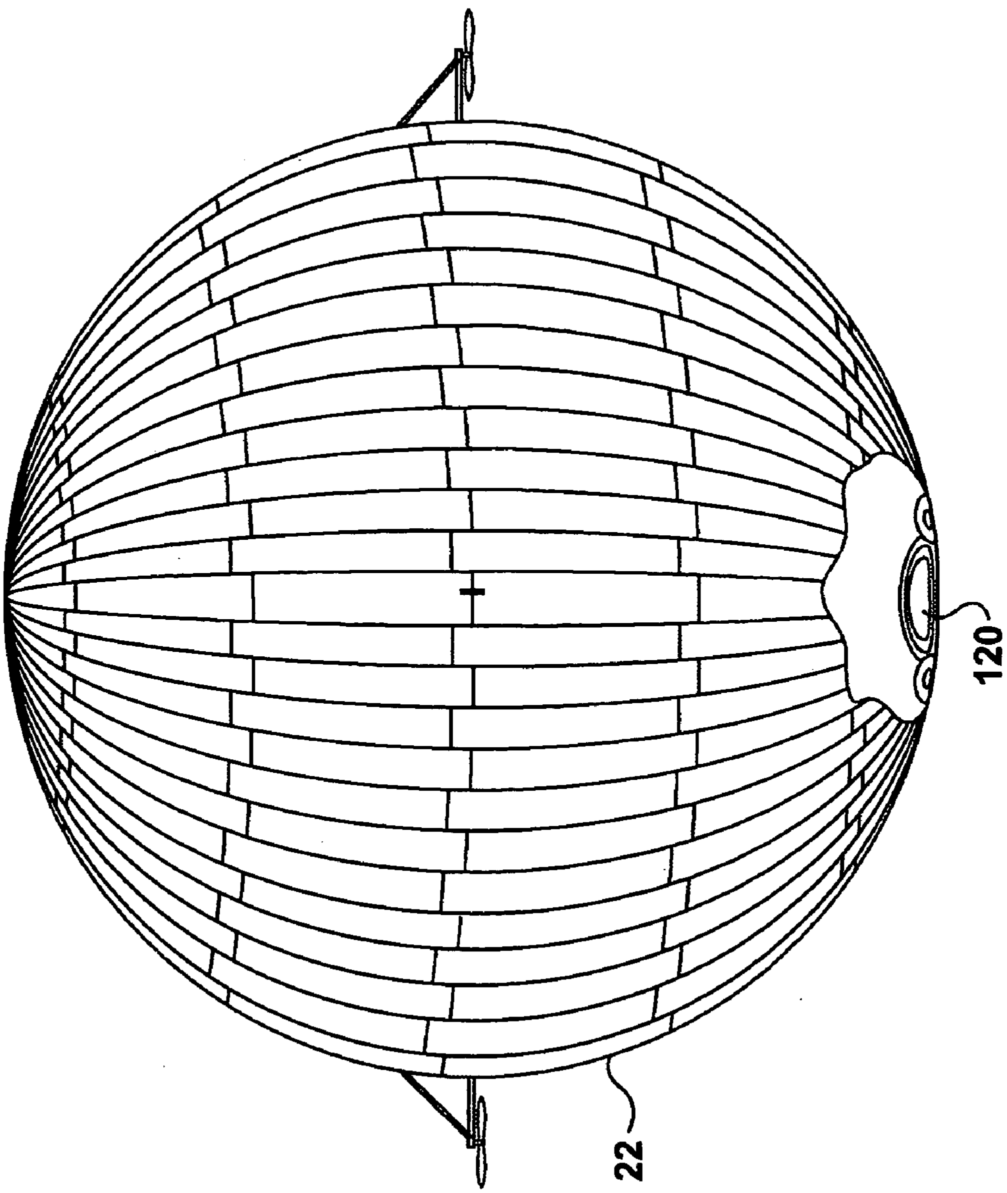
FIG. 4*a* shows the location of an equipment bay for the airship of FIG. 1*a;*
Figure 4B:
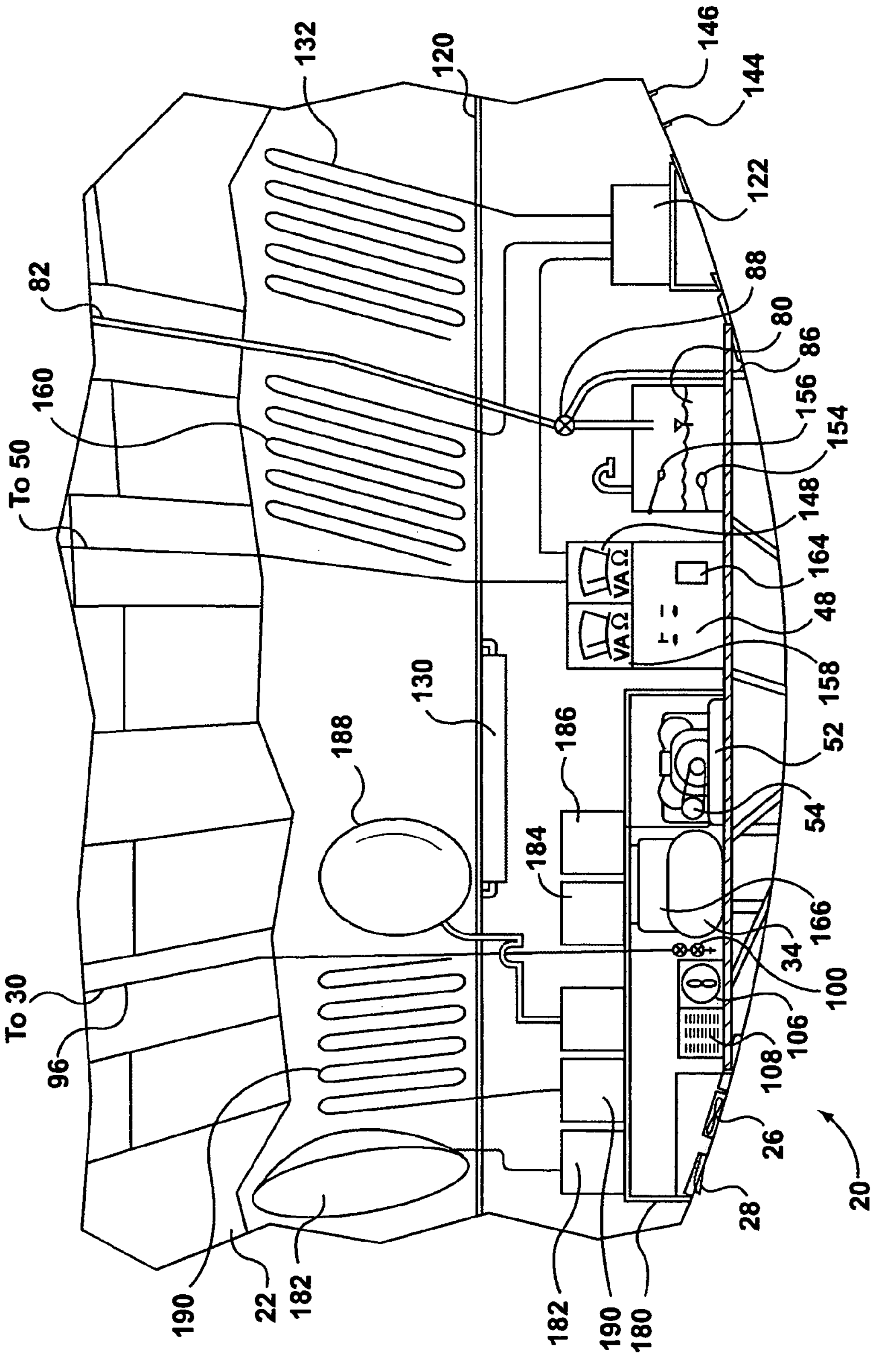
FIG. 4*b* is an enlarged sketch of a possible layout for the equipment bay of FIG. 4*a;*

In the embodiment of FIG. 1, propulsion is provided by a pair of symmetrically mounted propulsion devices, in the nature of propellers 36, 38 that are mounted on first and second, right and left hand cantilevered pylons 40, 42. Propellers 36, 38 are driven by a pair of matched first and second variable speed electric motors 44, 46. Current for these electric motors is drawn from a storage element in the nature of a battery 48, that is itself charged by the combined efforts of a solar cell array 50 mounted to the upwardly facing regions of outer envelope 22, and an auxiliary power unit 52 that drives a generator 54.

Auxiliary power unit 52 may include an internal combustion engine. In the preferred embodiment, APU 52 is a turbocharged diesel engine. Alternatively, APU 52 can be a gasoline engine, or a hydrogen and oxygen fuel cell. In the event that a fuel cell is employed, power from solar cell array 50 can be used during the daytime to recharge the fuel cell, while the fuel cell can operate at night to provide power to maintain the aircraft on station.

Propellers 36 and 38 may be rigidly mounted in an orientation permitting vertical operation in forward or reverse to cause airship 20 to ascend or descend when another propulsive means is provided for horizontal motion and turning. In the instance when propellers 36 and 38 are mounted in a rigid orientation to control ascent and descent, a small, sideways mounted, reversible, variable speed yaw thrust propeller 56 is mounted to the leading portion of airship 20.

Alternatively, propellers 36 and 38 may be mounted on pivoting heads 58, 60 that are capable of being rotated from 0 to 90 degrees from horizontal i.e., between a fully downward pusher orientation for climbing to a fully horizontal position for roughly level horizontal flight. Inasmuch as motors 44 and 46 may preferably be reversible, variable speed DC motors, descent is provided by operating propellers 36 and 38 in reverse. Control of this pivoting is by electric motors 62, 64 geared to turn heads 58 and 60. Angular orientation of heads 58, 60, provides vertical and horizontal motion. Differential speed operation of propellers 36, 38 causes turning of airship 20 about the z-axis. It is preferred that propellers 36, 38 have a diameter in the range of 10–20 ft, and an operational speed in the range of 0 to 400 rpm, forward or reverse.

In the horizontal position (that is, zero ascent or zero descent), a leading portion of outer envelope 22 is designated generally as 70. During forward level flight the stagnation point $P_{Stagnation}$ will lie in this forward, or leading region, typically more or less at the leading extremity. A trailing region 72 lies on the opposite extremity of outer envelope 22, and faces rearward during forward flight. In the preferred embodiment, a boundary layer separation suppression apparatus in the nature of an air pump, such as third propeller 74, is mounted on a fixed pylon 76 standing outwardly aft of trailing region 72. Propeller 74 is a pusher propeller connected to a variable speed electric motor 78, and works as an air pump to urge air to flow away from trailing region 72 and to be driven rearwardly. This may tend to create a region of relatively low pressure aft of trailing region 72 and may tend to cause the point of separation of the flow about outer envelope 22 to be located closer to trailing region 72 than might otherwise be the case, with a consequent reduction in drag and improvement in forward conduct of airship 20. In the preferred embodiment in which outer envelope 22 is about 250 ft in diameter, propeller 74 is about 40 ft in diameter, and turns at a rate of between zero and 250 rpm. A boundary layer separation suppression element 75, namely roughening 77, is mounted to leading region 70.

Re-Fuelling

Figure 5:
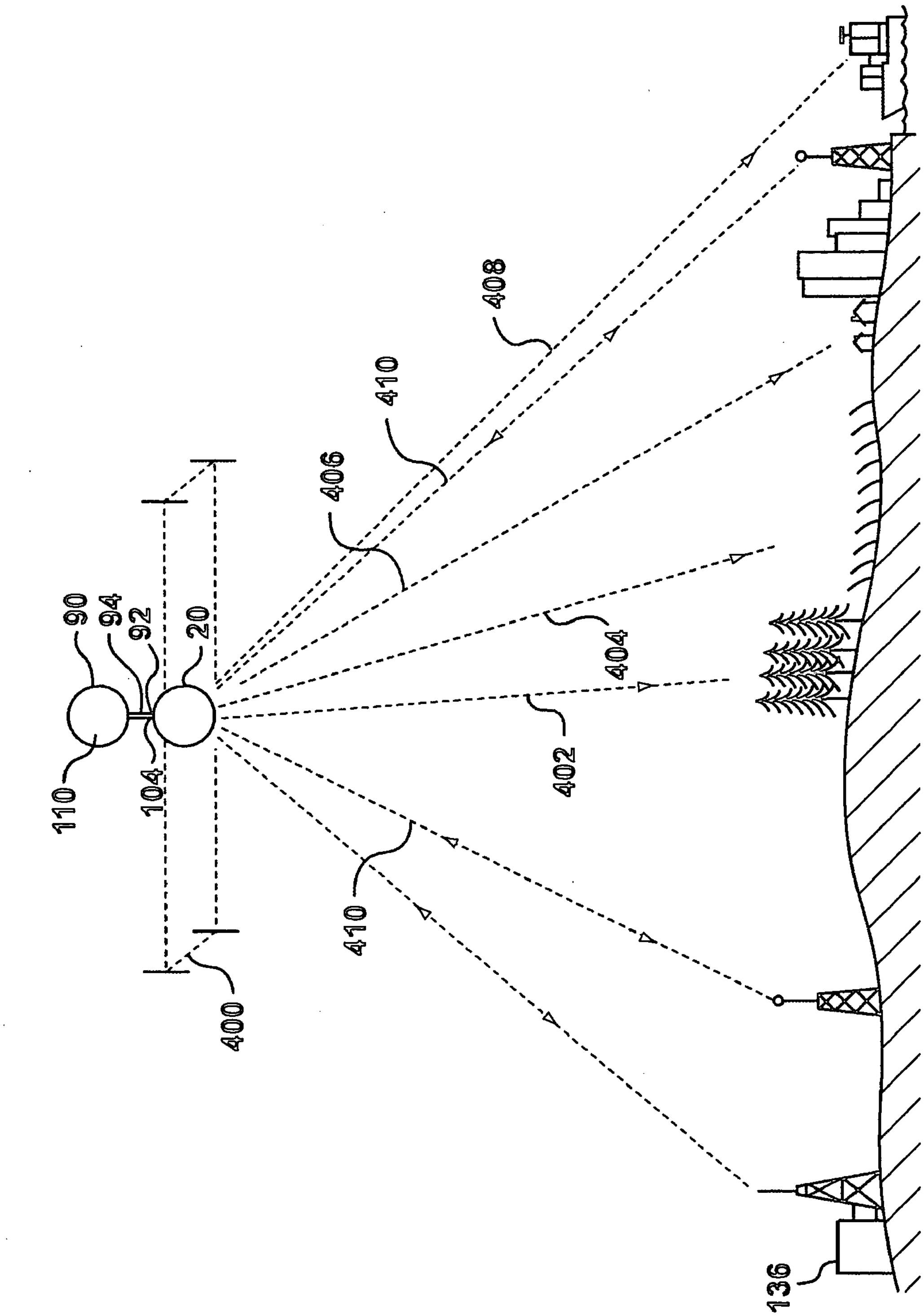
FIG. 5 shows an illustration of the operation of the airship of FIG. 1*a;*

Airship 20 has an auxiliary power unit fuel reservoir 80 located in a lower region thereof. Optionally, fuel reservoir 80 may have a filler line 82 mounted externally to outer envelope 22, and a docking receptacle 84 mounted centrally to the top of outer envelope 22. Filler line 82, receptacle 84, and reservoir 80 are all electrically grounded to the chassis of APU 52. Filler line 82 also has a drain line 86 and three way valve 88. Replenishment of reservoir 80 can be undertaken by flying a tanker airship 90 (FIG. 5) of similar spherical shape to a height above aircraft 20, and maintaining airship 90 in position. An electrically grounded filling nozzle is lowered to engage receptacle 84. When in position, nozzle 92 is energized to clamp to receptacle 84, making a sealed, and electrically grounded, connection. Fuel is then permitted to flow through line 82 to replenish reservoir 80. While this occurs, aircraft 90 may release lifting gas at a rate corresponding to the rate of fuel transfer so as to maintain approximately neutral buoyancy. Similarly, inflation of gas bag 30 of aircraft 20 may be increased at the same rate to maintain approximately neutral buoyancy of aircraft 20. During replenishment three way valve 88 is set to permit flow from receptacle 84 to reservoir 80. When reservoir 80 approaches a “full” condition, aircraft 90 is signalled to cease filling. A valve on delivery line 94 is closed, and line 94 is permitted to drain through nozzle 92. Line 82 is similarly permitted to drain into reservoir 80. When line 82 has been drained in this way, valve 88 is set to permit line 82 to drain through drain line 86. Nozzle 92 is de-energized, delivery line 94 is retracted, and aircraft 90 returns to base.

Optionally, and preferably, airship 20 may be provided with a lifting gas replenishment system. To this end, a flexible high pressure lifting gas replenishment line 96 is connected to supplementary lifting gas reservoir 34, flow being controlled by valve 100. Line 96 terminates at a replenishment fitting 102 mounted adjacent to auxiliary power unit fuel receptacle 84. When aircraft 90 is in position, a corresponding probe 104 is inserted, locked, and sealed in fitting 102. As fuel is being transferred through line 82, a corresponding amount of lifting gas flows along line 96, providing a sufficient amount of lifting gas for filling gas bag 30 to counter-act the additional weight of the fuel. This may tend to maintain both airship 20 and airship 90 at neutral buoyancy by simultaneous transfer of fuel and lifting gas. In the event that there were an “unbalanced” requirement of either fuel or lifting gas, this would be balanced by releasing either ballast or lifting gas as the situation might require.

Airship 90 may vent excess lifting gas to ambient to maintain neutral buoyancy, or optionally airship 90 may be provided with a lifting gas compressor 106 and heat exchanger 108, operable to extract and compress lifting gas from gas bag 110 of aircraft 90 as re-fuelling of aircraft 20 occurs.

Control Module

The lower region of outer envelope 22 houses an equipment blister 120 sewn generally inwardly of the otherwise generally spherical surface of outer envelope 22. Equipment blister 120 houses a control module 122 connected to operate motors 44, 46, 62, 64, 78 and APU 52, hence controlling propulsion and direction of airship 20. In addition control module 122 is operable to control inflation of (a) gas bag 30, (b) bleed of excess lifting gas from gas bag 30, (c) positive pressurisation of outer envelope 22 by blower 26, and pressure relief by value 28, (d) port, starboard and stern navigational lights 124, 126, 128; (e) the refuelling system described above; and (f) internal lights 130. Control module 122 is connected to a radio aerial array 132 by which control and equipment monitoring signals are sent to a remotely located controlling station, indicated in FIG. 5 as 136. Controlling station 136 is preferably a ground station, whether at a fixed installation or in a mobile installation such as a command truck, but could also be a ship-borne controlling station or an airborne controlling station. Control module 122 is also connected to sensors 144, 146 for measuring external ambient temperature and pressure; V-A-Ω Meter, 148 for measuring current and voltage from solar cell array 50; sensors 150, 152 (FIG. 1*b*) for measuring gas bag temperature and pressure; 154, 156 for measuring APU fuel supply in reservoir 80; V-A-Ω Meter 158 for measuring motor current draw; antenna 160 for receiving global positioning system or other telemetry data, 162 for measuring relative air speed; and 164, 166 for measuring stored charge (in the case of battery power) and fuel cell status (in the case of use of a fuel cell). Inputs from the various sensors are used to permit (a) the controlling station to be aware of the status of the operating systems of aircraft 20, and (b) control of the operation of airship 20.

Equipment Modules

An equipment pallet 180 is mounted within the lower region of outer envelope 22 near to control module 122. Equipment pallet 180 can serve as a base for equipment used for one or several functions. Pallet 180 can be a base for a communications relay station 182, whether for sending messages, for receiving messages, merely acting as a reflector for messages, or for acting as a relay station operable to boost an incoming message and to re-transmit it.

Pallet 180 can also provide a platform for one or more of (a) camera equipment, such as a gyro-stabilised camera 184, whether a still camera or a video camera; (b) thermal imaging equipment 186; (c) a radar set 188; and (d) radio signal monitoring equipment.

To the extent that outer envelope 22 and gas bag 30 are generally transparent to electromagnetic waves in the frequency ranges of interest, namely the communications and radar frequencies, aircraft 20 provides a suitable, protected mount for either receiving or transmitting aerials 190, and other equipment.

Alternate Configurations

The airship need not be precisely spherical. For example the generally spherical shape could be somewhat elongated, or could be somewhat taller than broad, or broader than tall. That is, in being spheroidal the length of airship 20 along the x-axis may lie in the range of perhaps 80% to 200% of the width of the airship measured along the y-axis, and the height of the aircraft measured along the z-axis may be in the range of ½ to 1½ of its length. Airship 20 need not be a perfect body of revolution. That is, the upper portion of airship 20 may be formed on a larger radius of curvature than the lower portion, or vice versa, or may have a rounded rectangular or trapezoidal form when viewed in cross-section whether to provide a suitable shape for solar cell array 50, or for a communications aerial array or some other reason. Nonetheless, it is preferred that the dimensions of airship 20 be such that, generally speaking, airship 20 is substantially spherical.

Lifting Gas

For high altitude operation (meaning operations above 18,000 ft, and, particularly above 40,000 ft.) the present inventor prefers the use of Hydrogen as the lifting gas. The flammability of Hydrogen, and the consequences of fire aboard an hydrogen filled airship are well known, and, in present times persons skilled in the art tend to avoid the use of hydrogen as a lifting gas. In that regard, the use of Helium, an inert gas, has generally replaced Hydrogen in blimps. However, a high altitude drone, that is maintained on station for long periods of time may tend to be a suitable application for Hydrogen. That is, the higher the altitude, the thinner the air, and air at high altitude is sufficiently thin that it may tend not to support combustion without compression. Second, when employed as a surveillance platform or as a communications station, airship 20 may tend to land and take-off only infrequently, reducing the opportunity for unfortunate events. Third, in the preferred embodiment the aircraft is un-manned. For low altitude applications, or applications involving manned flight, Helium is preferred.

Figure 6:
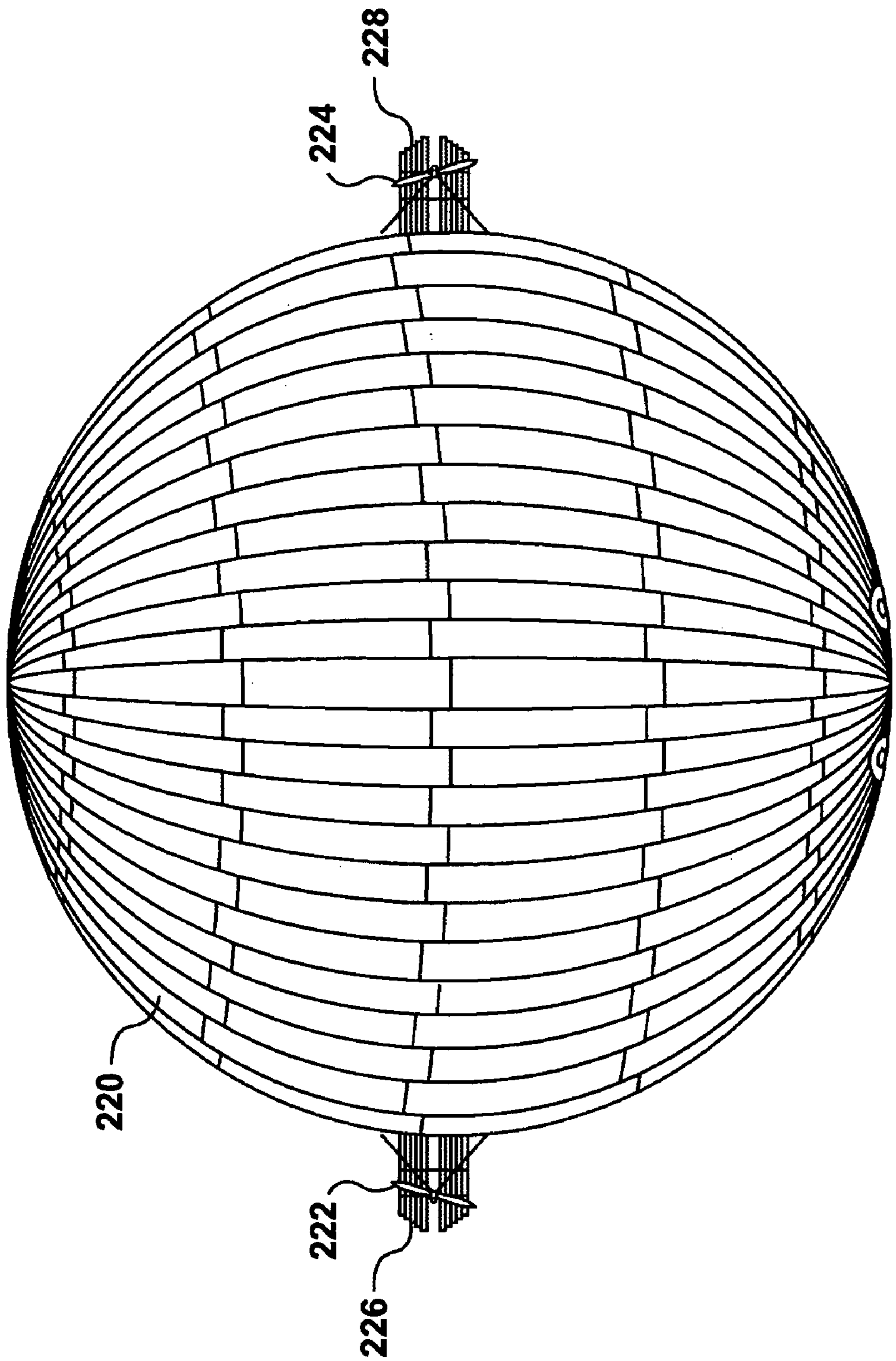
FIG. 6 shows an alternate embodiment of an airship to that of FIG. 1*a*.

An alternate embodiment of airship 220 is shown in FIG. 6. Airship 220 is similar in structure and operation to airship 20, but differs in having a pair of cantilevered propellers 222, 224 and directional vane arrays 226, 228 for directing the backwash of the propellers upward or downward to ascend or descend, in the manner described in my U.S. Pat. No. 5,294,076.

Figure 7:
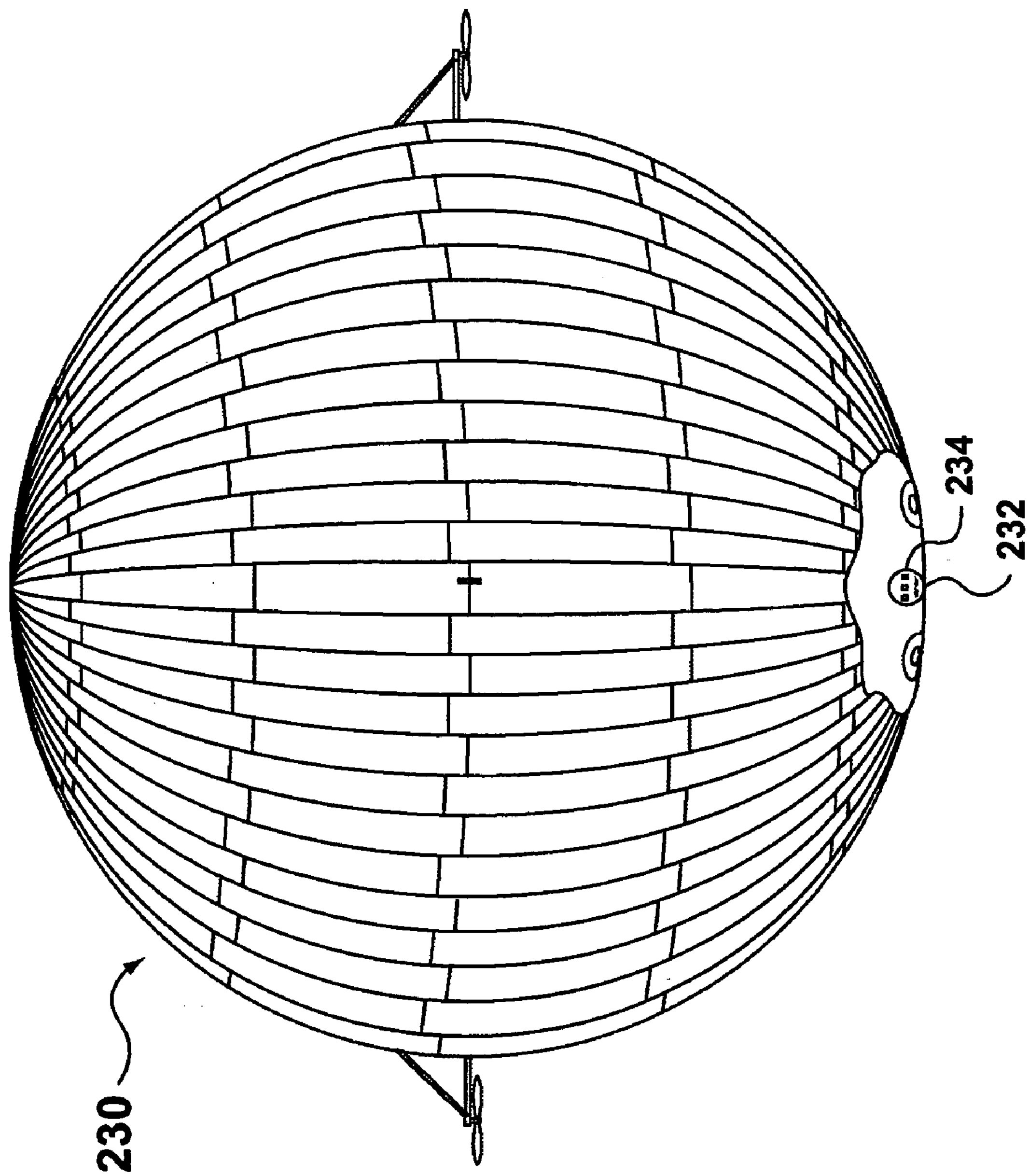
FIG. 7 shows another alternate embodiment of airship to that of FIG. 1*a*.

In another alternate embodiment shown in FIG. 7, an airship 230 is the same as airship 20, but includes a pressurized cockpit 232 for a pilot. The pilot is provided with an high altitude pressure suit and is connected to a supply of oxygen 234.

The use of a rearward thrusting propeller, such as propeller 74 is not limited to a substantially spherical airship, such as airship 20 for use at high altitude. In an alternate embodiment, a pusher propeller can be used during low altitude operation as well.

The proportion of inflation of gas bag 30 at sea level tends to correspond to the service ceiling of the aircraft. That is, partial inflation can be made for the given operational service ceiling, be it 10,000 ft, 18,000 ft, 40,000 ft, 60,0000 ft or higher. The volume of sea level inflation may be of the order of 70% of maximum inflation by volume to achieve a service ceiling of about 10,000 ft, 50% to achieve a service ceiling of about 18,000 ft, 25% to achieve a service ceiling of about 35,000 ft; 20% to achieve a service ceiling of about 40,000 ft, 10% to achieve a service ceiling of about 50,000 ft; about 7½% to achieve a service ceiling of 60,000 ft; and about 5% to achieve a service ceiling of about 70,000 ft. In the preferred embodiment, the aircraft has a service ceiling of about 60,000 ft.

In operation as a loitering platform, outer envelope 22 is pressurised by fan 26, and the various equipment bays are loaded, and the fuel reservoir is filled. Gas bag 30 is inflated with sufficient lifting gas to provide neutral buoyancy, the lifting gas tending to collect in bag 30 near the upper extremity of the spherical enclosure of outer envelope 22, with the heaviest objects, namely the equipment modules being mounted at the lower extremity. This relative positioning will tend to yield a center of buoyancy that is well above the center of mass, tending to provide stability, even for partial inflation.

When approximately neutral buoyancy has been achieved, the propulsion and control system is activated to conduct airship 20 to a desired loitering location, or on a patrol route during which observations are made. When airship 20 has been established at its loitering location 400 it can then be used as a telecommunications platform, or as a surveillance platform with suitable equipment as enumerated above. During loitering, the propulsion and control system is operated to maintain airship 20 within a target zone. This can be done either automatically by central processing equipment aboard airship 20, or be remote processing equipment that monitors conditions aboard airship 20, and transmits commands to the various propulsion components accordingly. During daylight operation, solar cell array 50 charges batteries 48 or recharges fuel cell 166. During night-time operation, propellers 44, 46, 74 work from battery power, fuel cell power, or power generated by auxiliary power unit 52. After a period of time, such as several days or possibly a month or more, a second airship can be used to re-fuel airship 20 and to replenish the lifting gas reservoir.

During loitering, airship 20 may undertake one or more of the steps of photographing 402; obtaining thermal images 404; radio signal observation, monitoring, or jamming 406; radar operation 408; or receiving, sending, reflecting, boosting or relaying telecommunications signals 410. To the extent that outer envelope 22 and gas bag 30 are substantially translucent, lights 130 inside airship 22 can be used to illuminate airship 22, and, given its altitude and relatively large size, (perhaps as much as 250 ft in diameter in one embodiment) airship 22 can serve as a beacon visible from long distances, or as a display for advertising.

Various embodiments of the invention have now been described in detail. Since changes in and or additions to the above-described best mode may be made without departing from the nature, spirit or scope of the invention, the invention is not to be limited to those details but only by the appended claims.

I claim:

1. A substantially spherical aircraft comprising an outer envelope having a leading region and a trailing region, said aircraft having buoyancy apparatus operable to maintain said aircraft aloft, propulsion and directional apparatus co-operable to conduct said aircraft; and at least one boundary layer separation suppression element operable to encourage said aircraft to proceed as conducted, said at least one boundary layer separation suppression element, during operation for forward conduct, lowering air pressure substantially adjacent said trailing region and shifting away from said leading region, a point at which airflow about said outer envelope separates therefrom.

2. The substantially spherical aircraft of claim 1 wherein said propulsion apparatus includes a pusher propeller.

3. The substantially spherical aircraft of claim 2 wherein said aircraft has a main diametral dimension D1, and said propeller has a diameter D2, where D2 lies in the range of 10% to 25% of D1.

4. The substantially spherical aircraft of claim 2 wherein said pusher propeller operates between 0 and 250 r.p.m.

5. The substantially aircraft of claim 2 wherein said pusher propeller has a tip speed of less than 500 ft/s.

6. The substantially spherical aircraft of claim 2 wherein said pusher propeller is driven by an electric motor.

7. The substantially spherical aircraft of claim 1 wherein said aircraft has a fuel replenishment system, said fuel replenishment system being operable while said aircraft is aloft.

8. The substantially spherical aircraft of claim 1 wherein at least one of said propulsion and directional apparatus includes an internal combustion engine and a fuel replenishment system, said fuel replenishment system being operable while said aircraft is aloft.

9. The substantially spherical aircraft of claim 1 wherein said aircraft has solar cell panels.

10. The substantially spherical aircraft of claim 1 wherein said aircraft includes an electro magnetic interface member chosen from the set of electro-magnetic interface members capable of performing at least one of (a) receiving an electro-magnetic wave form; (b) sending an electro-magnetic wave form; (c) relaying an electro-magnetic wave form; and (c) reflecting an electro-magnetic wave form.

11. The substantially spherical aircraft of claim 1 wherein said aircraft includes communications equipment operable to perform at least one of (a) receiving communications signals (b) sending communications signals; (c) relaying communications signals; and (d) reflecting communications signals.

12. The substantially spherical aircraft of claim 1 wherein said aircraft includes surveillance equipment.

13. The substantially spherical aircraft of claim 12 wherein said surveillance equipment is chosen from the set of surveillance equipment consisting of at least one of (a) communications monitoring equipment; (b) thermal imaging equipment; (c) photographic equipment; and (d) radar.

14. The substantially spherical aircraft of claim 1 wherein said aircraft has a cowling, and said cowling is substantially transparent to at least radio frequency electro-magnetic waves.

15. The substantially spherical aircraft of claim 14 wherein said aircraft has, mounted within said cowling, at least one of:

(A) communications equipment operable to perform at least one of (a) receiving communications signals (b) sending communications signals; (c) relaying communications signals; and (d) reflecting communications signals; and (B) surveillance equipment chosen from the set of surveillance equipment consisting of at least one of (a) communications monitoring equipment; (b) thermal imaging equipment; (c) photographic equipment; and (d) radar.

16. The substantially spherical aircraft of claim 14 wherein said cowling is internally pressurized relative to ambient conditions external to said aircraft.

17. The substantially spherical aircraft of claim 1 wherein said aircraft is remotely controlled.

18. A substantially spherical aircraft comprising:

an outer envelope having a leading region and a trailing region;

buoyancy apparatus operable to maintain said aircraft aloft;

propulsion and directional apparatus co-operable to conduct said aircraft, said propulsion apparatus including a pusher propeller driven by an electric motor;

at least one boundary layer separation suppression element operable to encourage said aircraft to proceed as conducted, said at least one boundary layer separation suppression element, during operation for forward conduct, shifting away from said leading region, a point at which airflow about said outer envelope separates therefrom; and an internal combustion engine and an electric generator driven thereby.

19. A substantially spherical aircraft, said substantially spherical aircraft having a weight and an internal volume, said aircraft having an outer, load-bearing envelope defining said internal volume, buoyancy apparatus operable to maintain said aircraft aloft, propulsion and directional apparatus co-operable to conduct said aircraft; said buoyancy apparatus including an inner envelope mounted within said outer, load-bearing envelope; said internal volume being maintained at an elevated pressure relative to the external, ambient pressure to maintain said substantially spherical shape of said aircraft; said inner envelope containing a buoyant lifting fluid; said inner envelope being variably inflatable to occupy a variable portion of said internal volume; and under ambient conditions at sea level on a 59° F. day, when said inner envelope is inflated to as little as 70% of said internal volume, said inner envelope provides a buoyant force at least as great as said weight, and said aircraft having at least one of:

(A) communications equipment operable to perform at least one of (a) receiving communications signals (b) sending communication signals; (c) relaying communications signals; and (d) reflecting communications signals; and (B) surveillance equipment chosen from the set of surveillance equipment consisting of at least one of (a) communications monitoring equipment; (b) thermal imaging equipment; (c) photographic equipment; and (d) radar.

20. A method for operating a buoyant aircraft, said method comprising the steps of:

providing an aircraft of substantially spherical shape, said aircraft having an internal volume and a weight, said aircraft including an outer, load-bearing envelope defining said internal volume; an inner, inflatable envelope housed within said internal volume, and said aircraft having a propulsion system and a directional control system;

maintaining said internal volume at an elevated pressure relative to the external, ambient pressure;

inflating said inner, inflatable envelope with a lifting fluid to a first volume sufficient to at least balance said weight, said first volume, at sea level, being less than 70% of said internal volume; and operating said propulsion and directional control systems to a location greater than 10,000 ft above sea level.

21. The method of claim 20 wherein said method includes the step of maintaining said aircraft in a loitering location.

22. The method of claim 21 wherein said step of maintaining said aircraft in said loitering position includes the step of maintaining lateral and longitudinal position variation relative to a deviation radius of 1000 M.

23. The method of claim 22 including maintaining said aircraft at an altitude of at least 15,000 ft.

24. The method of claim 20 and further including at least one of the steps chosen from the set of steps consisting of:

(A) operating as a communication platform to do at least one of (a) receiving communications signals (b) sending communications signals; (c) relaying communications signals; and (d) reflecting communications signals; and (B) operating as a surveillance platform to (a) monitor communications; (b) produce thermal imaging; (c) take photographs; and (d) to operate a radar.

25. The method of claim 20 including the step of controlling operation of said buoyant aircraft from a remote location.

* * * * *